US010619852B2

(12) United States Patent
Porter et al.

(10) Patent No.: US 10,619,852 B2
(45) Date of Patent: Apr. 14, 2020

(54) HEAT SHIELD WITH ROUND TOP PIN FINS AND FLAT TOP PIN FINS FOR IMPROVED MANUFACTURING PROCESSES

(71) Applicant: United Technologies Corporation, Farmington, CT (US)

(72) Inventors: Steven D. Porter, Wethersfield, CT (US); John W. Mubeezi, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 274 days.

(21) Appl. No.: 15/686,344

(22) Filed: Aug. 25, 2017

(65) Prior Publication Data

US 2019/0063750 A1 Feb. 28, 2019

(51) Int. Cl.
F23R 3/00 (2006.01)
F23M 5/04 (2006.01)
B22C 7/02 (2006.01)
F23M 5/08 (2006.01)
F02C 7/24 (2006.01)

(52) U.S. Cl.
CPC .............. *F23R 3/002* (2013.01); *B22C 7/02* (2013.01); *F23R 3/005* (2013.01); *F02C 7/24* (2013.01); *F23M 5/04* (2013.01); *F23M 5/085* (2013.01); *F23M 2900/05003* (2013.01); *F23R 2900/00018* (2013.01); *F23R 2900/03044* (2013.01)

(58) Field of Classification Search
CPC ............ F23R 3/002; F23R 2900/03044; F23R 2900/03045; F05D 2260/2212; F05D 2260/22141; B22C 7/02; B22D 29/00

USPC ........................ 164/34, 35, 45, 516, 344, 347
See application file for complete search history.

(56) References Cited

U.S. PATENT DOCUMENTS 5,201,847 A * 4/1993 Whidden ................ F01D 9/023
                                                      415/177
5,353,865 A    10/1994 Adiutori et al.
8,745,988 B2    6/2014 Verhiel et al.
(Continued)

FOREIGN PATENT DOCUMENTS

EP        3315865 A2      5/2018
WO    WO-2015116937 A1 *  8/2015 .............. F23R 3/005

OTHER PUBLICATIONS

The Extended European Search Report for Application No. 18190692. 6-1009; Report Issued dated Jan. 21, 2019; Report Received dated Jan. 23, 2019; 8 pages.

*Primary Examiner* — Todd E Manahan
*Assistant Examiner* — Todd N Jordan
(74) *Attorney, Agent, or Firm* — Cantor Colburn LLP

(57) ABSTRACT

According to one embodiment, a heat shield panel for a combustor of a gas turbine engine is provided. The heat shield comprising: a panel body having a first surface configured to be oriented toward a combustion zone of a combustor, and a second surface opposite the first surface, the second surface being configured to be oriented toward a combustor liner of the combustor; a plurality of first pin fins projecting from the second surface of the panel body, wherein each of the plurality of first pin fins has a rounded top opposite the second surface; and one or more second pin fins projecting from the second surface of the panel body, wherein each of the one or more second pin fins has a flat top opposite the second surface.

20 Claims, 6 Drawing Sheets

(56) References Cited

U.S. PATENT DOCUMENTS

| | | |
|---|---|---|
| 2005/0047932 A1 | 3/2005 | Nakae et al. |
| 2009/0145581 A1 | 6/2009 | Hoffman et al. |
| 2010/0223931 A1 | 9/2010 | Chila et al. |
| 2011/0108257 A1 | 5/2011 | Miyake |
| 2015/0362192 A1* | 12/2015 | Cunha .................. F23R 3/002 60/772 |
| 2016/0025010 A1* | 1/2016 | Soucy .................. F23R 3/002 60/806 |
| 2016/0033129 A1* | 2/2016 | Burd .................. F23R 3/002 60/752 |
| 2016/0109130 A1* | 4/2016 | Stastny .................. F23R 3/04 60/755 |
| 2017/0003027 A1* | 1/2017 | Kostka .................. F23R 3/005 |

* cited by examiner

HEAT SHIELD WITH ROUND TOP PIN FINS AND FLAT TOP PIN FINS FOR IMPROVED MANUFACTURING PROCESSES

BACKGROUND

The subject matter disclosed herein generally relates to combustors in gas turbine engines and, more particularly, to heat shield panels in combustors of gas turbine engines.

A combustor of a gas turbine engine may be configured and required to burn fuel in a minimum volume. Such configurations may place substantial heat load on the structure of the combustor (e.g., panels, shell, etc.). Such heat loads may dictate that special consideration is given to structures which may be configured as heat shields or panels configured to protect the walls of the combustor. Even with such configurations, excess temperatures at various locations may occur leading to oxidation, cracking, and high thermal stresses of the heat shields or panels. Manufacturing of heat shield panels is a difficult process and improvements to the manufacturing process are greatly desired.

SUMMARY

According to one embodiment, a heat shield panel for a combustor of a gas turbine engine is provided. The heat shield comprising: a panel body having a first surface configured to be oriented toward a combustion zone of a combustor, and a second surface opposite the first surface, the second surface being configured to be oriented toward a combustor liner of the combustor; a plurality of first pin fins projecting from the second surface of the panel body, wherein each of the plurality of first pin fins has a rounded top opposite the second surface; and one or more second pin fins projecting from the second surface of the panel body, wherein each of the one or more second pin fins has a flat top opposite the second surface.

In addition to one or more of the features described above, or as an alternative, further embodiments may include that the one or more second pin fins are intermittently spaced amongst the plurality of first pin fins.

In addition to one or more of the features described above, or as an alternative, further embodiments may include that the one or more second pin fins are separated from each other by about 0.5 inches (1.27 centimeters).

In addition to one or more of the features described above, or as an alternative, further embodiments may include that the flat top of each of the one or more second pin fins is about parallel to the second surface where each of the one or more second pin fins are located.

In addition to one or more of the features described above, or as an alternative, further embodiments may include that each of the plurality of first pin fins are about equal in height.

In addition to one or more of the features described above, or as an alternative, further embodiments may include that each of the plurality of first pin fins have a height equal to about 0.023 inches (0.058 centimeters).

In addition to one or more of the features described above, or as an alternative, further embodiments may include that each of the plurality of first pin fins further comprises a first radius located proximate the second surface and a second radius located proximate the rounded top, and wherein the first radius is different from the second radius.

In addition to one or more of the features described above, or as an alternative, further embodiments may include that the first radius is larger than the second radius.

In addition to one or more of the features described above, or as an alternative, further embodiments may include that the first radius is about equal to 0.015 inches (0.0381 centimeters).

In addition to one or more of the features described above, or as an alternative, further embodiments may include that the second radius is about equal to 0.0125 inches (0.03175 centimeters).

In addition to one or more of the features described above, or as an alternative, further embodiments may include that each of the plurality of first pin fins further comprises a diameter, and wherein a ratio of the height to the diameter is about equal to 0.8.

In addition to one or more of the features described above, or as an alternative, further embodiments may include that each of the one or more second pin fins further includes a radius about equal to a radius of each of the plurality of first pin fins.

In addition to one or more of the features described above, or as an alternative, further embodiments may include that each of the one or more second pin fins further includes a radius greater than a radius of each of the plurality of first pin fins.

In addition to one or more of the features described above, or as an alternative, further embodiments may include one or more third pin fins projecting from the second surface of the panel body, wherein each of the one or more third pin fins has a flat top opposite the second surface.

In addition to one or more of the features described above, or as an alternative, further embodiments may include that each of the one or more third pin fins are located proximate one of the one or more second pin fins.

In addition to one or more of the features described above, or as an alternative, further embodiments may include connectors to connect the panel body to the combustor liner.

In addition to one or more of the features described above, or as an alternative, further embodiments may include that each of the plurality of first pin fins are cylindrical in shape.

In addition to one or more of the features described above, or as an alternative, further embodiments may include that each of the one or more second pin fins are cylindrical in shape.

According to another embodiment, a combustor for a gas turbine engine is provided. The combustor for a gas turbine engine comprising: a combustor liner defining a combustion volume; and at least one heat shield panel comprising: a panel body having a first surface configured to be oriented toward a combustion zone of the combustor, and a second surface opposite the first surface, the second surface being configured to be oriented toward the combustor liner of the combustor; a plurality of first pin fins projecting from the second surface of the panel body, wherein each of the plurality of first pin fins has a rounded top opposite the second surface; and one or more second pin fins projecting from the second surface of the panel body, wherein each of the one or more second pin fins has a flat top opposite the second surface.

According to another embodiment, a method of manufacturing a heat shield panel, the method comprising: pouring melted wax into a negative pattern of a heat shield panel, the heat shield panel comprising: a panel body having a first surface configured to be oriented toward a combustion zone of a combustor, and a second surface opposite the first surface, the second surface being configured to be oriented toward a combustor liner of the combustor; a plurality of first pin fins projecting from the second surface of the panel body, wherein each of the plurality of first pin fins has a rounded top opposite the second surface; and one or more second pin fins projecting from the second surface of the panel body, wherein each of the one or more second pin fins has a flat top opposite the second surface; allowing the wax to solidify to form a positive pattern of the heat shield panel; removing the positive pattern from the negative pattern by using an ejector rod to push the positive pattern away from the negative pattern at the flat top of each of the one or more second pin fins; coating the positive pattern with a ceramic; melting the positive pattern away from the ceramic, the ceramic having a cavity forming a second negative pattern of the heat shield panel; pouring melted metal into the cavity; allowing metal in the cavity to cool to form the heat shield panel; and removing the ceramic from the heat shield panel.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines experience elevated heat levels during operation. Impingement and convective cooling of panels of the combustor wall may be used to help cool the combustor. Convective cooling may be achieved by air that is trapped between the panels and a shell of the combustor. Impingement cooling may be a process of directing relatively cool air from a location exterior to the combustor toward a back or underside of the panels.

Thus, combustor liners and heat shields are utilized to face the hot products of combustion within a combustion chamber and protect the overall combustor shell. The combustor liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustor liner inside the combustor. In order to increase surface area of the heat shield panel and thus also increase cooling, the back side of the heat shield panel may include pin fins that extend away from the panel. The pin fins introduces challenges into the manufacturing process, which is typically done by investment casting. The pin fins inhibit the removal for a wax mold from a negative mold of the heat shield panel. Embodiments disclosed herein include apparatuses and methods to aid in the removal of a wax mold from a negative mold of the heat shield panel during the investment casting manufacturing process.

Figure 1:
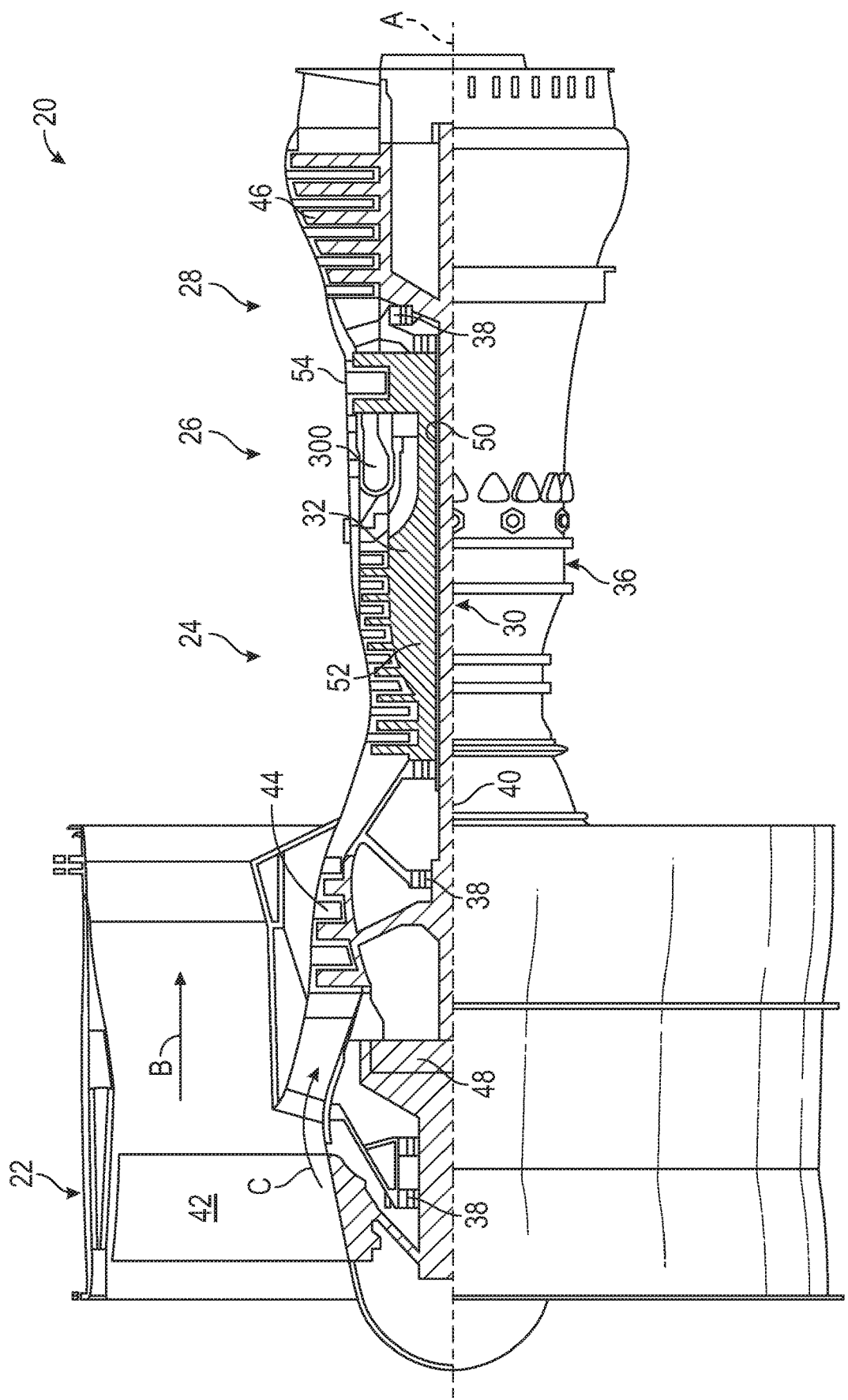
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]0.5. The "Low corrected fan tip speed" as disclosed herein according to one non-limiting embodiment is less than about 1150 ft/second (350.5 m/sec).

Figure 2:
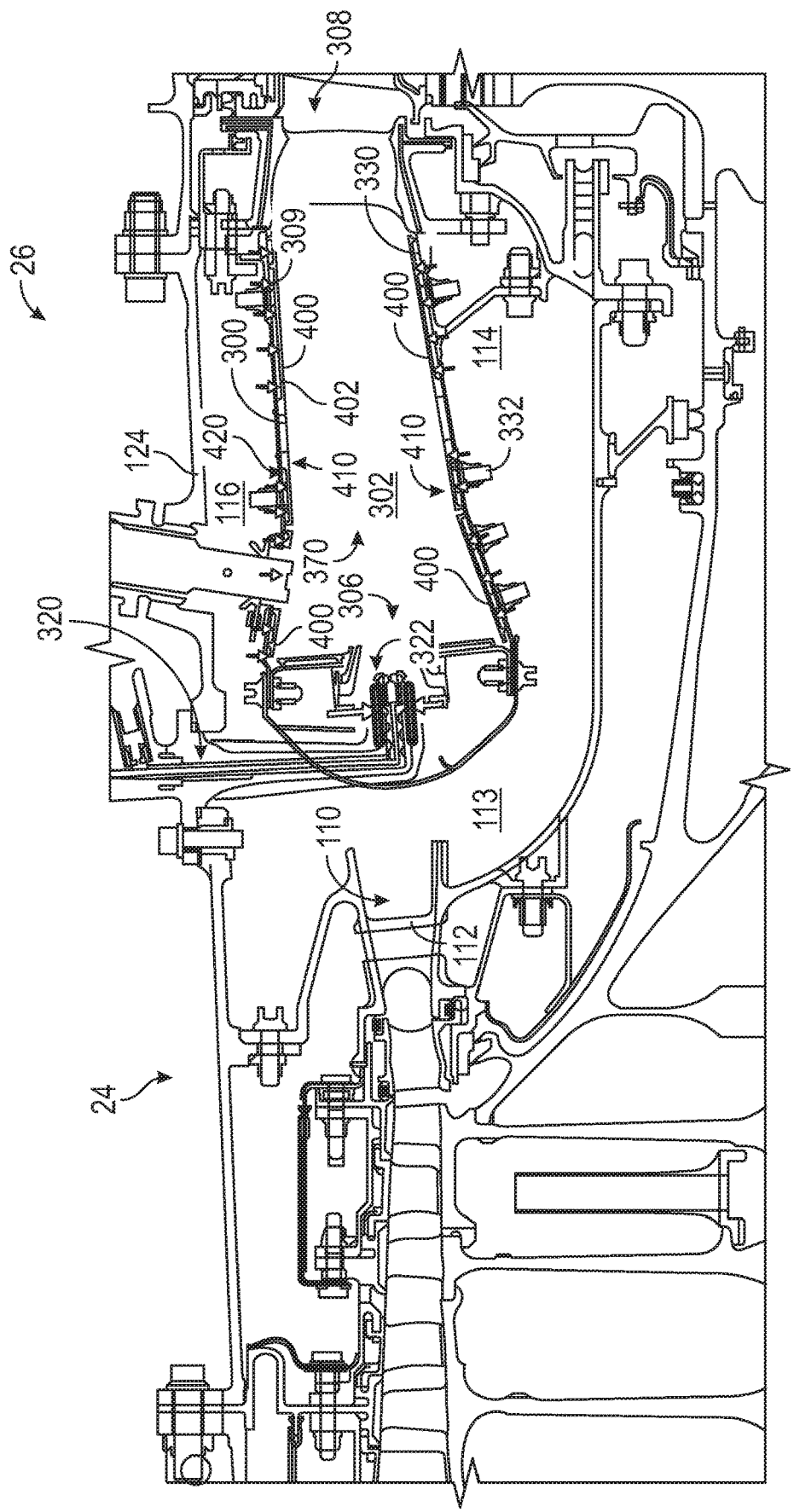
FIG. 2 is a cross-sectional illustration of a combustor, in accordance with an embodiment of the disclosure.

Referring now to FIG. 2 with continued reference to FIG. 1. FIG. 2 illustrates a combustor section 26 of a gas turbine engine 20. As shown, a combustor 300 defines a combustion chamber 302. The combustion chamber 302 includes a combustion zone 370, as shown in FIG. 2. The combustor 300 includes an inlet 306 and an outlet 308 through which air may pass. The air may be supplied to the combustor 300 by a pre-diffuser 110.

As shown in FIG. 2, compressor air is supplied from a compressor section 24 into an exit guide vane 112, as will be appreciated by those of skill in the art. The exit guide vane 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113 a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion chamber 302 by means of one or more aperture 309, which may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 100 may be housed within a shroud case 124 which may define the shroud chamber 113.

The combustor 300, as shown in FIG. 2, includes multiple heat shield panels 400 that are mounted on an interior surface of one or more combustion liner 330 and are arranged parallel to the combustion liner 330. The combustion liner 330 can define circular or annular structures with the heat shield panels 400 being mounted on a radially inward liner and a radially outward liner, as will be appreciated by those of skill in the art. The heat shield panels 400 can be removably mounted to the combustion liner 330 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the combustion liner 330 such that the heat shield panel 400 may be attached to the combustion liner 330 and held in place. The heat shield panels 400 partial enclose a combustion zone 360 within the combustion chamber 302 of the combustor 300.

The heat shield panel 400 is composed of a panel body 402 having a first surface 410 and a second surface 420 opposite the first surface 410. The first surface 410 is configured to be oriented toward the combustion zone 370 of the combustor 300. The second surface 420 is configured to be oriented toward a combustor liner 330 of the combustor 300.

Figure 3:
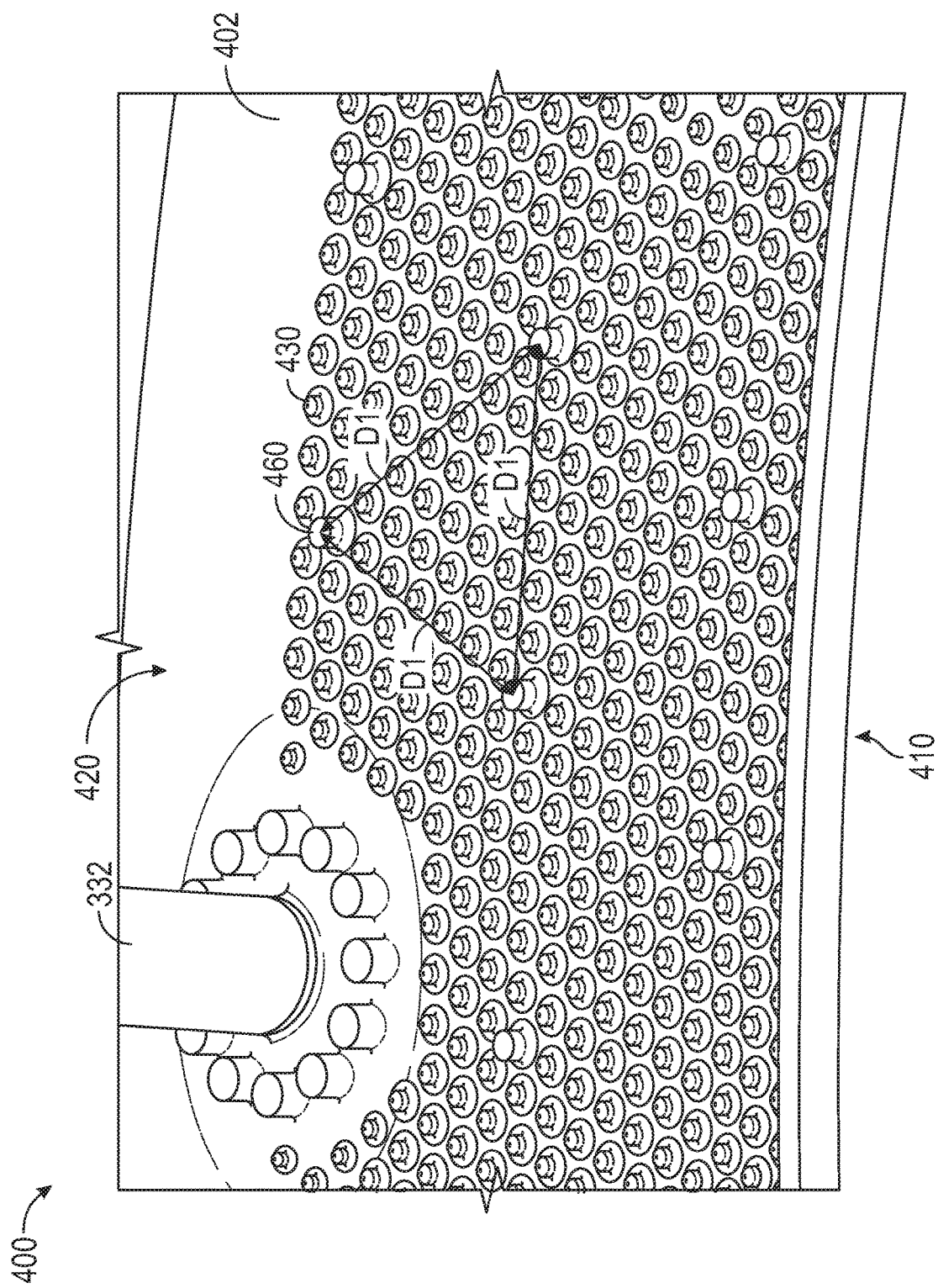
FIG. 3 is an illustration of a heat shield panel, in accordance with an embodiment of the disclosure.
Figure 4:
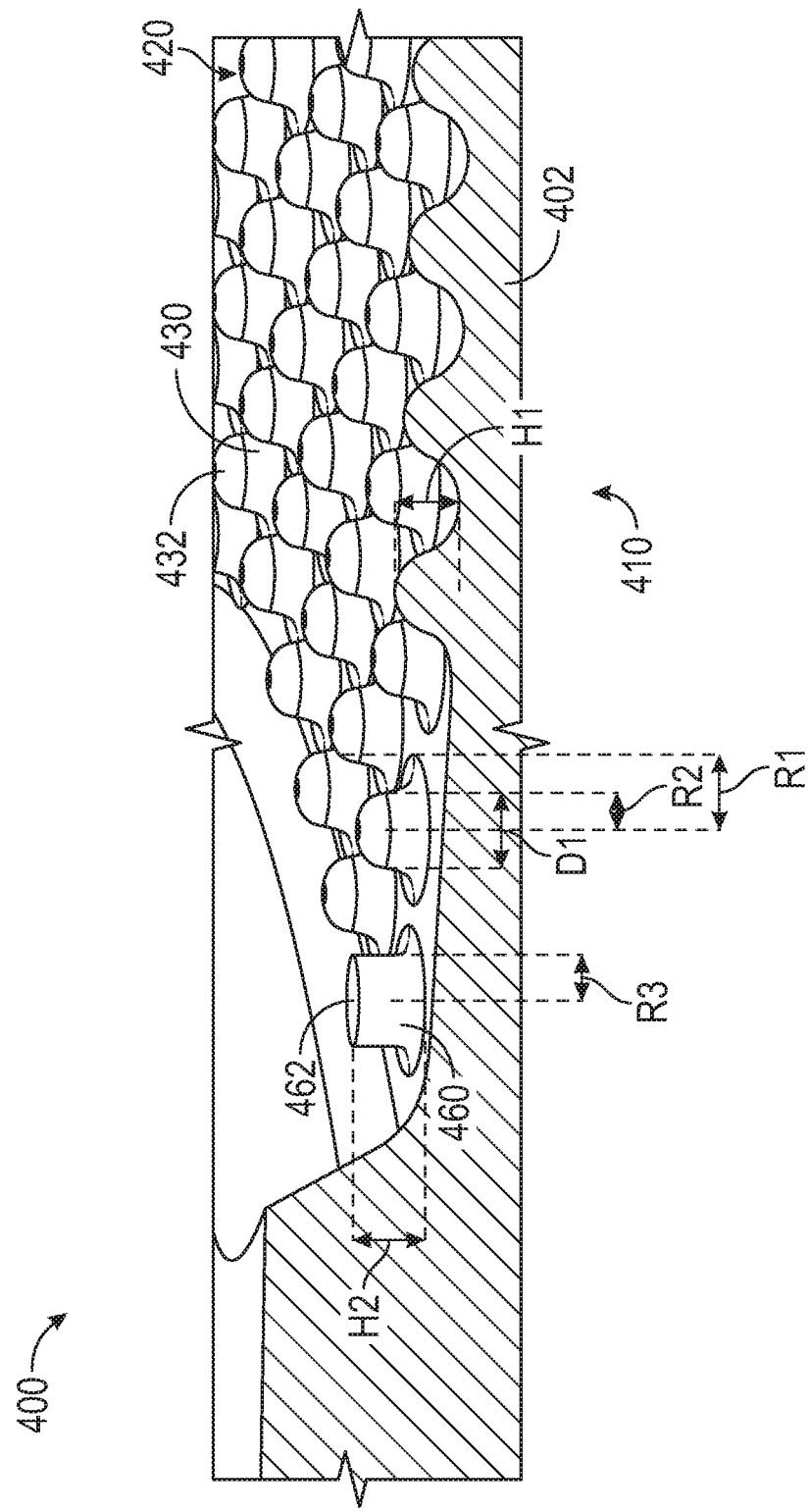
FIG. 4 is an illustration of a heat shield panel, in accordance with an embodiment of the disclosure.
Figure 5:
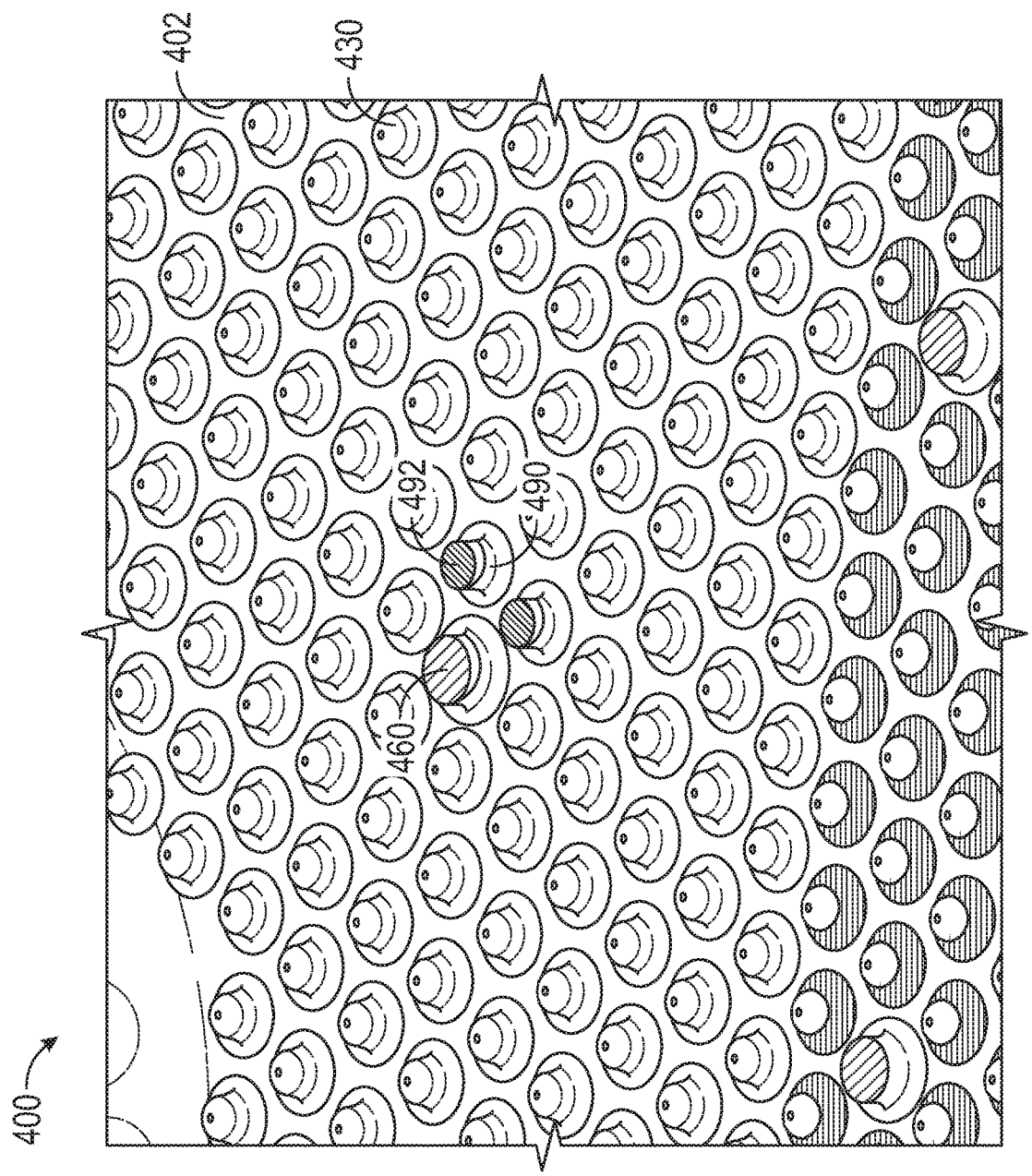
FIG. 5 is an illustration of a heat shield panel, in accordance with an embodiment of the disclosure.

Referring now to FIG. 3-5 with continued reference to FIGS. 1 and 2. FIG. 3 illustrates an enlarged view of a heat shield panel 400 of the combustor 300 of a gas turbine engine 20. As discussed above, the heat shield panel 400 is composed of a panel body 402 having a first surface 410 and a second surface 420 opposite the first surface 410. The heat shield panel 400 further includes a plurality of first pin fins 430 projecting from the second surface 420 of the panel body 410. Each of the plurality of first pin fins 430 has a rounded top 432 opposite the second surface 420. Each of the plurality of first pin fins may be cylindrical in shape as seen in FIGS. 3-4. It is understood that each of the plurality of first pin fins 430 may have shapes other than cylindrical. The heat shield panel 400 also includes one or more second pin fins 460 projecting from the second surface 420 of the panel body 410. Each of the one or more second pin fins 460 has a flat top 462 opposite the second surface 420. Each of the one or more second pin fins may be cylindrical in shape as seen in FIGS. 3-4. It is understood that each of the one or more second pin fins 430 may have shapes other than cylindrical. In an embodiment, the flat top 462 of each of the one or more second pin fins 460 is about parallel to the second surface 420 where each of the one or more second pin fins are located. It is understood that the second surface 420 may be curved, thus the flat top 462 of each of the one or more second pin fins 460 may be parallel to the second surface 420 where each of the one or more second pin fins 460 are located. Advantageously, having the flat top 462 parallel to the second surface 420 allows an ejector rod to be utilized during manufacturing to provide a force perpendicular to the second surface 420 in order to remove a wax mold away from a negative mold of the heat shield panel 400 (discussed later in relation to method 600). A connector 332 to connect the panel body 400 to the combustor liner 330 may be seen in FIG. 3.

As seen in FIG. 3, the one or more second pin fins 460 are intermittently spaced amongst the plurality of first pin fins 430. The one or more second pin fins 460 may be spaced apart from each other by a first selected distance D1. In an embodiment, the first selected distance D1 may be about equal to 0.5 inches (1.27 centimeters), thus the one or more second pin fins 460 are separated from each other by about 0.5 inches (1.27 centimeters). In an embodiment, each of the first pin fins 430 may be equal in height H1. The height H1 is the distance measured from the rounded top 432 to the second surface 420, as seen in FIG. 4. In another embodiment, each of the plurality of first pin fins 430 have a height H1 equal to about 0.023 inches (0.058 centimeters). The height H2 of each of the one or more second pin fins 460 may be equal to the height H1 of each of the plurality of first pin fins 430. Moreover, each of the plurality of first pin fins 430 include a first radius R1 located proximate the second surface 420 and a second radius R2 located proximate the rounded top 432. As seen in FIG. 4, the first radius R1 is different from the second radius R2. The first radius may be larger than the second radius R2. In an embodiment, the first radius R1 is about equal to 0.015 inches (0.0381 centimeters). In an embodiment, the second radius R2 is about equal to 0.0125 inches (0.03175 centimeters). Each of the plurality of first pin fins 430 include a diameter DIA1. In embodiment, the diameter DIA1 may be about equal to 0.030. In another embodiment, a ratio (H1/DIA1) of the height H1 to the diameter DIA1 is about equal to 0.8.

Each of the one or more second pin fins 460 may have a radius R3 different than a radius R1, R2 of each of the plurality of first pin fins 430. In an embodiment, each of the one or more second pin fins 460 may include a radius R3 about equal to a radius R1, R2 of each of the plurality of first pin fins 430. Whereas, in another embodiment, each of the one or more second pin fins 460 further includes a radius R3 greater than a radius R1, R2 of each of the plurality of first pin fins 430. For example, second pin fin 460 may take up the same area of multiple first pin fins 430 on the second surface 420. In another embodiment, panel body 402 may include one or more third pin fins 490 projecting from the second surface 420 of the panel body 402. Each of the one or more third pin fins 490 has a flat top 492 opposite the second surface 420. Each of the one or more third pin fins 490 may be located proximate one of the one or more second pin fins 460, as seen in FIG. 5. Advantageously, the third pin fins 490 may provide points for additional leverage for an ejector rod during the manufacturing process of the heat shield panel 400.

Figure 6:
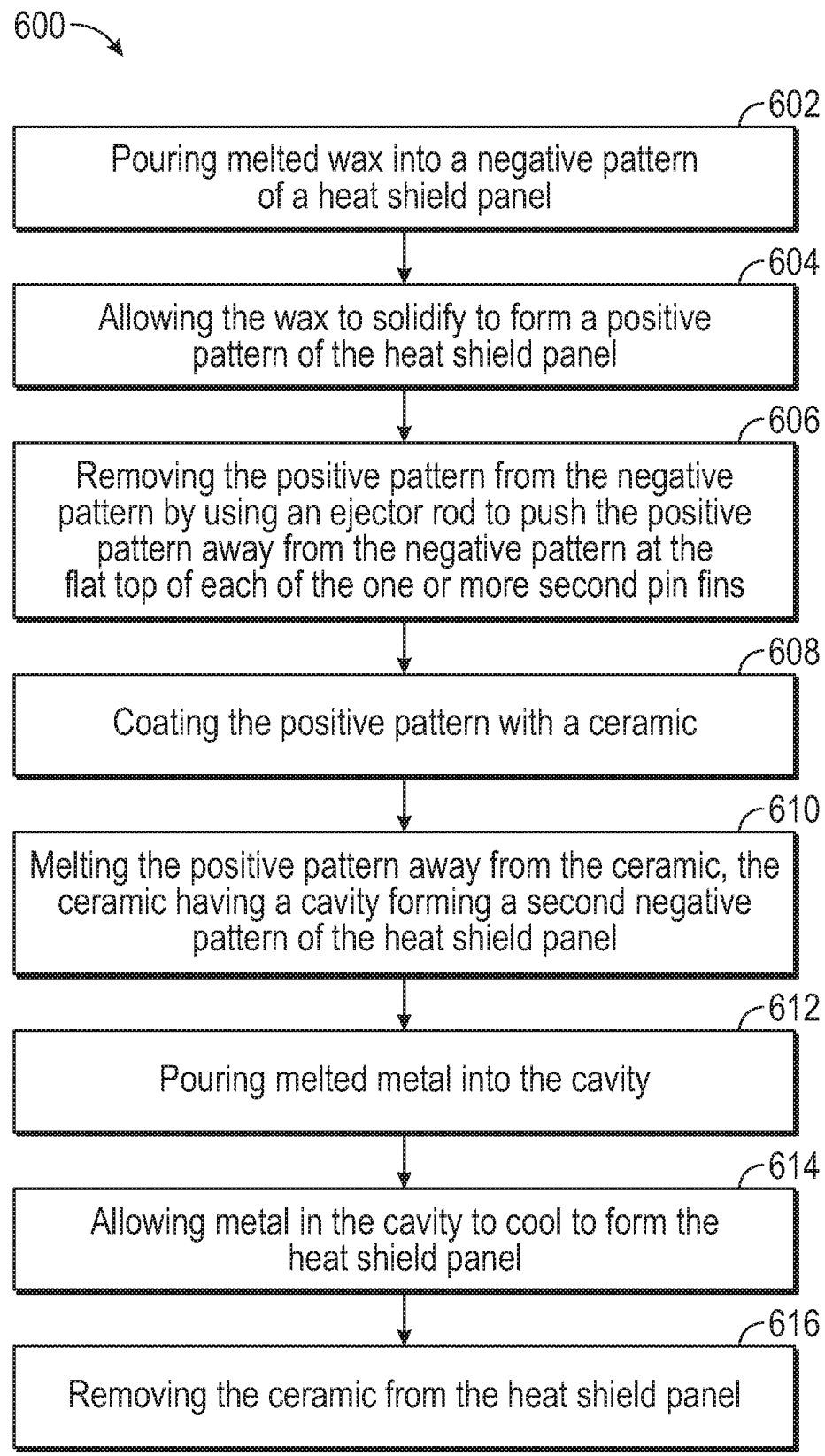
FIG. 6 is a flow chart illustrating a method of manufacturing a heat shield panel for a combustor of a gas turbine engine, in accordance with an embodiment of the disclosure.

Referring now to FIG. 6 with continued reference to FIGS. 1-5. FIG. 6 is a flow chart illustrating a method 600 of manufacturing a heat shield panel 400, according to an embodiment of the present disclosure. At block 602, melted wax is poured into a negative pattern of a heat shield panel 400. At block 604, the wax is allowed to solidify to form a positive pattern of the heat shield panel 400. At block 606, the positive pattern made from wax is removed from the negative pattern by using an ejector rod to push the positive pattern away from the negative pattern at the flat top 462 of each of the one or more second pin fins 460. At block 608, the positive pattern made from wax is coated with a ceramic. At block 610, the positive pattern made from wax is melted away from the ceramic, thus leaving a cavity formed in the ceramic. The cavity forming a second negative pattern of the heat shield panel 400. At block 612, melted metal is poured into the cavity within the ceramic. At block 614, metal within the cavity is allowed to cool to form the heat shield panel 400. At block 616, the ceramic is removed from the heat shield panel 400 and what remains is the full formed metallic heat shield panel 400.

While the above description has described the flow process of FIG. 6 in a particular order, it should be appreciated that unless otherwise specifically required in the attached claims that the ordering of the steps may be varied.

Technical effects of embodiments of the present disclosure include utilizing pin fins with flat tops spaced intermittently amongst pin fins with round tops in order to ease the manufacturing process of a heat shield panel for a combustor of a gas turbine engine.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat shield panel for a combustor of a gas turbine engine, comprising:
   a panel body having a first surface configured to be oriented toward a combustion zone of a combustor, and a second surface opposite the first surface, the second surface being configured to be oriented toward a combustor liner of the combustor;
   a plurality of first pin fins projecting from the second surface of the panel body, wherein each of the plurality of first pin fins has a rounded top opposite the second surface; and
   one or more second pin fins projecting from the second surface of the panel body, wherein each of the one or more second pin fins has a flat top opposite the second surface,
   wherein the one or more second pin fins comprise a first flat top pin fin, a second flat top pin fin, and a third flat top pin fin that are organized in an equidistant triangular configuration amongst the plurality of the first pin fins.

2. The heat shield panel of claim 1, wherein the one or more second pin fins are intermittently spaced amongst the plurality of first pin fins.

3. The heat shield panel of claim 1, wherein the first flat top pin fin, the second flat top pin fin, and the third flat top pin fin are separated from each other by about 0.5 inches (1.27 centimeters).

4. The heat shield panel of claim 1, wherein the flat top of each of the one or more second pin fins is about parallel to the second surface where each of the one or more second pin fins are located.

5. The heat shield panel of claim 1, wherein each of the plurality of first pin fins are about equal in height.

6. The heat shield panel of claim 1, wherein each of the plurality of first pin fins have a height equal to about 0.023 inches (0.058 centimeters).

7. The heat shield panel of claim 1, wherein each of the plurality of first pin fins further comprises a first radius located proximate the second surface and a second radius located proximate the rounded top, and wherein the first radius is different from the second radius.

8. The heat shield panel of claim 7, wherein the first radius is larger than the second radius.

9. The heat shield panel of claim 8, wherein the first radius is about equal to 0.015 inches (0.0381 centimeters).

10. The heat shield panel of claim 8, wherein the second radius is about equal to 0.0125 inches (0.03175 centimeters).

11. The heat shield panel of claim 5, wherein each of the plurality of first pin fins further comprises a diameter, and wherein a ratio of the height to the diameter is about equal to 0.8.

12. The heat shield panel of claim 1, wherein each of the one or more second pin fins further includes a radius about equal to a radius of each of the plurality of first pin fins.

13. The heat shield panel of claim 1, wherein each of the one or more second pin fins further includes a radius greater than a radius of each of the plurality of first pin fins.

14. The heat shield panel of claim 1, further comprising: one or more third pin fins projecting from the second surface of the panel body, wherein each of the one or more third pin fins has a flat top opposite the second surface.

15. The heat shield panel of claim 14, wherein: each of the one or more third pin fins are located proximate one of the one or more second pin fins.

16. The heat shield panel of claim 1, further comprising: connectors to connect the panel body to the combustor liner.

17. The heat shield panel of claim 1, wherein: each of the plurality of first pin fins are cylindrical in shape.

18. The heat shield panel of claim 1, wherein: each of the one or more second pin fins are cylindrical in shape.

19. A combustor for a gas turbine engine, comprising:
a combustor liner defining a combustion volume; and
at least one heat shield panel comprising:
a panel body having a first surface configured to be oriented toward a combustion zone of the combustor, and a second surface opposite the first surface, the second surface being configured to be oriented toward the combustor liner of the combustor;
a plurality of first pin fins projecting from the second surface of the panel body, wherein each of the plurality of first pin fins has a rounded top opposite the second surface; and
one or more second pin fins projecting from the second surface of the panel body, wherein each of the one or more second pin fins has a flat top opposite the second surface,
wherein the one or more second pin fins comprise a first flat top pin fin, a second flat top pin fin, and a third flat top pin fin that are organized in an equidistant triangular configuration amongst the plurality of first pin fins.

20. A heat shield panel for a combustor of a gas turbine engine, comprising:
a panel body having a first surface configured to be oriented toward a combustion zone of a combustor, and a second surface opposite the first surface, the second surface being configured to be oriented toward a combustor liner of the combustor;
a plurality of first pin fins projecting from the second surface of the panel body, wherein each of the plurality of first pin fins has a rounded top opposite the second surface;
a second pin fin projecting from the second surface of the panel body, wherein the second pin fin has a flat top opposite the second surface; and
a third pin fin projecting from the second surface of the panel body, wherein the third pin fin has a flat top opposite the second surface, wherein the third pin fin is located directly next to the second pin fin, and wherein the third pin fin differs from the second pin fin in at least one of height and diameter.

* * * * *